United States Patent
Wang et al.

(10) Patent No.: US 10,354,378 B2
(45) Date of Patent: Jul. 16, 2019

(54) SYSTEMS AND METHODS FOR QUANTITATIVE ASSESSMENT OF MICROVASCULATURE USING OPTICAL COHERENCE TOMOGRAPHY ANGIOGRAPHY

(71) Applicant: University of Washington, Seattle, WA (US)

(72) Inventors: Ruikang K. Wang, Seattle, WA (US); Chieh-Li Chen, Seattle, WA (US); Zhongdi Chu, Seattle, WA (US); Qinqin Zhang, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 15/479,743

(22) Filed: Apr. 5, 2017

(65) Prior Publication Data
US 2017/0294015 A1    Oct. 12, 2017

Related U.S. Application Data

(60) Provisional application No. 62/319,168, filed on Apr. 6, 2016.

(51) Int. Cl.
| G06T 7/00 | (2017.01) |
| G06T 7/62 | (2017.01) |
| A61B 5/00 | (2006.01) |

(52) U.S. Cl.
CPC .............. *G06T 7/0012* (2013.01); *G06T 7/62* (2017.01); *G06T 2207/10101* (2013.01); *G06T 2207/30101* (2013.01)

(58) Field of Classification Search
CPC .................................... G06T 7/00; A61B 5/00
(Continued)

(56) References Cited

U.S. PATENT DOCUMENTS

| 6,689,160 B1 * | 2/2004 | Okuda ................ A61L 27/16 623/1.39 |
| 8,197,441 B2 * | 6/2012 | Webler ................ A61F 2/013 604/103.01 |

(Continued)

FOREIGN PATENT DOCUMENTS

WO    2015160763 A1    10/2015

OTHER PUBLICATIONS

Kim, Alice Y. et al., "Quantifying Microvascular Density and Morphology in Diabetic Retinopathy Using Spectral-Domain Optical Coherence Tomography Angiography", Invest Ophthalmol Vis Sci., 2016.

(Continued)

*Primary Examiner* — Abolfazl Tabatabai
(74) *Attorney, Agent, or Firm* — Perkins Coie LLP

(57) ABSTRACT

A five-index quantitative analysis of OCT angiograms is disclosed. One method of analyzing an anatomical region of interest of a subject includes acquiring vascular image data from the region of interest and generating a binary vasculature map from the vascular image data. A vessel skeleton map and vessel perimeter map are generated from the binary vasculature map. Based on the three generated maps, a vessel area density, vessel skeleton density, vessel perimeter index, vessel diameter index, and vessel complexity can be determined, in addition to detection of any flow impairment zones in the region of interest. These metrics can be used to detect and assess vascular abnormalities from multiple perspectives.

19 Claims, 5 Drawing Sheets

(58) Field of Classification Search
USPC .................................................. 382/128–134
See application file for complete search history.

(56) References Cited

U.S. PATENT DOCUMENTS

| | | | |
|---|---|---|---|
| 2003/0053669 A1* | 3/2003 | Suri .......................... | A61F 7/12 |
| | | | 382/130 |
| 2014/0073917 A1 | 3/2014 | Huang et al. | |
| 2016/0157737 A1 | 6/2016 | Huang et al. | |
| 2016/0183786 A1 | 6/2016 | Wei et al. | |
| 2016/0228000 A1 | 8/2016 | Spaide | |
| 2016/0278627 A1 | 9/2016 | Huang et al. | |

OTHER PUBLICATIONS

Kim, Alice Y. et al., "Quantifying Retinal Microvascular Changes in Uveitis Using Spectral-Domain Optical Coherence Tomography Angiography", American Journal of Ophthalmology, 2016.
Chu, Z., et al., "Repeatability and Reproducibility of Quantifying Parafoveal Vessel Density in Normal Subjects with OCT-based Microangiography." IOVS, vol. 56, Issue 7, Jun. 2015, 3 pages.
Ferrara, D., et al., "Investigating the choriocapillaris and choroidal vasculature with new optical coherence tomography technologies." Progress in Retinal and Eye Research, 52(2016), pp. 130-155.
Frangi, A., et al., "Multiscale Vessel Enhancement Filtering." Image Sciences Institute, 8 pages.
Hwang, T., et al., "Optical Coherence Tomography Angiography Features of Diabetic Retinopathy." Retina, vol. 35, No. 11, 2015, pp. 2371-2376.
Hwang, T., et al., "Optical Coherence Tomography Angiography Features of Diabetic Retinopathy." Retina, vol. 35, No. 11, 2015, 14 pages.
Jia, Y., et al., "Quantitative optical coherence tomography angiography of vascular abnormalities in the living human eye." PNAS, Apr. 20, 2015, pp. E2395-E2402.
Jia, Y., et al., "Split-spectrum amplitude-decorrelation angiography with optical coherence tomography." Optics Express, vol. 20, No. 4, Feb. 13, 2012, pp. 4710-4725.
Kashani, A., et al., "Optical Coherence Tomography Angiography of Retinal Venous Occlusion." Retina, vol. 35, No. 11, 2015, pp. 2323-2331.
Kim, A., et al., "Quantifying Microvascular Density and Morphology in Diabetic Retinopathy Using Spectral-Domain Optical Coherence Tomography Angiography." IOVS, vol. 57, No. 9, 9 pages.
Kim, A., et al., "Quantifying Retinal Microvascular Changes in Uveitis Using Spectral-Domain Optical Coherence Tomography Angiography." American Journal of Ophthalmology, vol. 171, Nov. 2016, pp. 101-112.
Klein, R., et al., "The Epidemiology of Age-Related Macular Degeneration." Perspective, vol. 137, No. 3, Mar. 2004, pp. 486-495.
Klein, B., "Overview of Epidemiologic Studies of Diabetic Retinopathy." Ophthalmic Epidemiology, 14: pp. 179-183.
Mackenzie, P., et al., "Vascular anatomy of the optic nerve head." Can J Ophthalmol, vol. 43, No. 3, 2008, pp. 308-312.
Mariampillai, A., et al., "Speckle variance detection of microvasculature using swept-source optical coherence tomography." Optics Letters, vol. 33, No. 13, Jul. 1, 2008, pp. 1530-1532.
Moult, E., et al., "Ultrahigh-Speed Swept-Source OCT Angiography in Exudative AMD." Ophthalmic Surg. Lasers Imaging Retina, 45(6), 2014, pp. 496-505.
Reif, R., et al., "Quantifying Optical Microangiography Images Obtained from a Spectral Domain Optical Coherence Tomography System." International Journal of Biomedical Imaging, vol. 2012, 12 pages.
Spaide, R., "Volume-Rendered Optical Coherence Tomography of Diabetic Retinopathy Pilot Study." Diabetic Retinopathy, vol. 160, No. 6, pp. 1200-1210.
Thorell, M., et al., "Swept-Source OCT Angiography of Macular Telangiectasia Type 2." Ophthalmic Surgery, Lasers & Imaging Retina, vol. 45, No. 5, Sep./Oct. 2014, pp. 369-380.
Wang, R., et al., "Depth-resolved imaging of capillary networks in retina and choroid using ultrahigh sensitive optical microangiography." Optics Letters, vol. 35, No. 9, pp. 1467-1469.
Wang, R., et al., "Three dimensional optical angiography." Optics Express, vol. 15, No. 7, Apr. 2, 2007, pp. 4083-4097.
Yin, X., et al., "User-guided segmentation for volumetric retinal optical coherence tomography images." Journal of Biomedical Optics, 19(8), Aug. 2014, 11 pages.
Zhang, A., et al., "Methods and algorithms for optical coherence tomography-based angiography: a review and comparison." Journal of Biomedical Optics, 20(10), Oct. 2015, 14 pages.
Zhang, A., et al., "Minimizing projection artifacts for accurate presentation of choroidal neovascularization in OCT microangiography." Biomedical Optics Express, vol. 6, No. 10, 14 pages.
Zhang, Q., et al., "Swept Source OCT Angiography of Neovascular Macular Telangiectasis Type 2." Retina, 35(11), pp. 2285-2299.
Zhang, Q., et al. "Wide-field imaging of retinal vasculature using optical coherence tomography-based microangiography provided by motion tracking." Journal of Biomedical Optics, 20(6), Jun. 2015, 10 pages.
Agemy, S., et al., "Retinal Vascular Perfusion Density Mapping Using Optical Coherence Tomography Angiography in Normals and Diabetic Retinopathy Patients." Retina, vol. 35, No. 11, 2015, pp. 2353-2363.
Braaf, B., et al., "Angiography of the retina and the choroid with phase-resolved OCT using interval-optimized backstitched B-scans." Optics Express, vol. 20, No. 18, Aug. 27, 2012, pp. 20516-20534.

* cited by examiner

SYSTEMS AND METHODS FOR QUANTITATIVE ASSESSMENT OF MICROVASCULATURE USING OPTICAL COHERENCE TOMOGRAPHY ANGIOGRAPHY

CROSS-REFERENCE TO RELATED APPLICATION(S)

This application claims the benefit of U.S. Provisional Application No. 62/319,168, filed Apr. 6, 2016, which is incorporated herein by reference in its entirety.

STATEMENT REGARDING FEDERALLY SPONSORED RESEARCH

This invention was made with government support under Grant No. R01EY024158, awarded by the National Institutes of Health (NIH). The government has certain rights in the invention.

TECHNICAL FIELD

The present application generally relates to quantitative assessment of medical images. In particular, some embodiments include systems and methods for evaluating vascular image data of a region of interest in a subject.

BACKGROUND

Optical coherence tomography angiography (OCTA) has been recently introduced for the imaging of microvascular networks in the human eye. Recent investigations using OCTA have been primarily focused on showcasing its applications in visualizing the flow characteristics of microvascular diseases within the macula, such as age-related macular degeneration (AMD) and diabetic retinopathy (DR), the two leading causes of blindness worldwide. In addition, OCTA has documented microvascular abnormalities in other macular diseases such as branch retinal vein occlusion (BRVO), central retinal vein occlusion (CRVO), and macular telangiectasia type 2 (MacTel2). Compared with conventional dye-based angiography, OCTA offers a safer, faster, and more cost effective alternative for ocular imaging of the macular vasculature. Overall, the combination of optical coherence tomography (OCT) and OCTA can present integrated structural and flow information of the human eye in vivo, opening new opportunities for both qualitative and quantitative analysis of ocular diseases.

Optical microangiography (OMAG) is one of the many OCTA approaches that utilizes the intrinsic properties of particles' (e.g., red blood cells) motion, to highlight the contrast between signals due to RBCs and signals due to static tissues. Unlike other OCTA approaches such as speckle variance, split-spectrum amplitude decorrelation angiography (SSADA), and phase variance, OMAG is able to harness motion information to the fullest extent by exploiting both amplitude and phase information contained within the OCT signals. Therefore, OMAG is able to produce OCT angiography with better vascular connectivity, higher signal-to-noise ratio (SNR), and higher sensitivity to capillary blood flows. Consequently, OMAG is being established as a valuable tool for the investigation of ocular diseases both qualitatively and quantitatively.

BRIEF DESCRIPTION OF THE DRAWINGS

FIGS. 4A-4K illustrate a demonstration of vessel complexity index quantification in which FIGS. 4A-4J are area and perimeter images with increasing visual complexity, and FIG. 4K illustrates corresponding quantification of the vessel complexity index.

DETAILED DESCRIPTION

Figure 1:
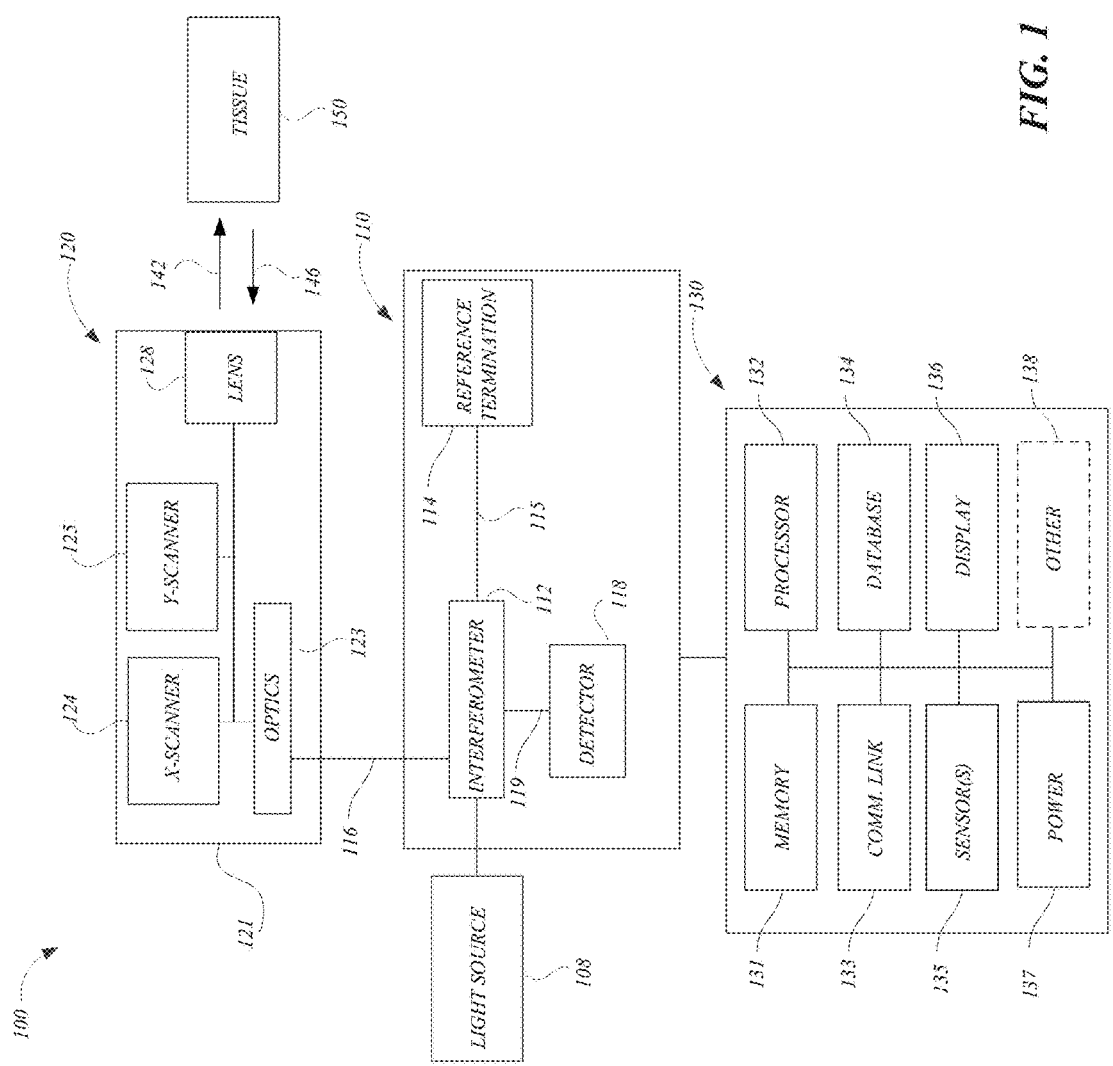
FIG. 1 is a schematic diagram of a medical imaging system configured in accordance with embodiments of the present technology.

To objectively assess OCT angiograms, a number of studies have introduced vessel area density (VAD), vessel skeleton density (VSD), and non-perfusion area. These parameters have been reported useful in the analyses of disease progression in age-related macular degeneration (AMD) and diabetic retinopathy (DR). While promising, there are limitations when evaluating indices individually. VAD provides information about the function of vascular network by calculating the percentage of area occupied by vessels on OCTA images. Thus, a change in VAD is coupled with changes in both vessel length and vessel size. Since the decrease of microvascular perfusion is sometimes accompanied with vessel dilation, VAD alone is only capable of providing partial information about vascular abnormalities. Similarly, VSD falls short because it only evaluates the vessel length without taking the vessel size information into account. Moreover, compared with fluorescein angiography (FA), it is difficult for OCTA to convey information about vascular leakage since it detects the existence of moving particles while FA senses the diffusion of injected dyes into the extravascular space. There has not been an attempt to extract vascular information other than vessel density from OCT angiograms.

Embodiments of the present technology provide for a comprehensive quantitative OMAG analysis for OCTA vascular images. For example, any combination of the following metrics may be utilized to quantitatively describe the OCTA images: VAD, VSD, vessel diameter index (VDI), vessel perimeter index (VPI) and vessel complexity index (CVI). The repeatability and utility of these metrics has been established in a number of clinical cases. With this comprehensive quantitative OMAG technique, clinicians and physicians can be equipped with a rapid strategy for interpreting OCT angiograms from multiple perspectives and to help simplify the process of identifying pathological vascular features so as to enable the objective assessment of disease progression and treatment monitoring.

These and other aspects of the present technology are described in greater detail below. Certain details are set forth in the following description and in FIGS. 1-5F to provide a thorough understanding of various embodiments of the present technology. Other details describing well-known systems and methods often associated with producing medical images (e.g., OCT images), and/or utilizing image processing techniques have not been set forth in the following disclosure to avoid unnecessarily obscuring the description of the various embodiments.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the invention can be practiced without several of the details described below.

Suitable System(s)

FIG. 1 is a schematic diagram of an imaging system 100 ("the system 100") configured in accordance with an embodiment of the disclosed technology. The system 100 includes an imaging module 110 operably coupled to a light source 108 and a computer or a processing subsystem 130. A sample arm 116 (e.g., a cable comprising one or more optical fibers) couples an imaging probe 120 to the imaging module 110. As explained in further detail below, the system 100 can be configured to produce OCT images of tissue using light 142 directed toward tissue 150 and backscattered light 146 received from the tissue 150 (e.g., a human eye) via the probe 120. The backscattered light 146 can be used by the processing subsystem 130 to form OCT images that show a flow of blood through portions (e.g., the retina) of the tissue 150.

The probe 120 includes a housing or an enclosure 121 configured to house image optics 123 that optically couple the probe 120 to the imaging module 110. The optics 123 may include, for example, one or more lenses, collimators, splitters, prisms and/or optical filters. In some embodiments, the optics 123 can include an optical filter configured to attenuate noise and other artifacts caused by reflections along a cavity. An x-scanner 124 and a y-scanner 125 (e.g., x-y galvanometric scanners) in the probe 120 are configured to perform scans of a region of interest in the tissue 150. A lens 128 is configured to focus and/or direct laser light 142 received from the light source 108 via the imaging module 110 toward the region of interest in the tissue 150. The lens 128 is further configured to direct backscattered light 146 received from the region of interest toward the x-scanner 124 and/or the y-scanner 125. In some embodiments, for example, the lens 128 includes a 5x telecentric lens. In one embodiment, the lens 128 may include, for example, an LSM03 lens having a working distance of 25.1 mm and commercially available from Thorlabs Inc. of Newton, N.J. In other embodiments, however, the lens 128 can include any lens suitable for OCT imaging.

The light source 108 can include, for example, a swept-source laser configured to output laser light. The light source 108 can be configured, for example, to sweep the laser wavelength across a broad spectral range near 1300 nm at a fixed repetition rate of 100 kHz. In some embodiments, the light source 108 includes a MEMS-tunable vertical cavity surface-emitting laser. In one embodiment, the light source 108 includes, for example, a SL1310V1-10048 model laser commercially available from Thorlabs Inc. In other embodiments, however, the light source 108 may include any light source suitable for OCT imaging. The light source 108 is configured to emit an output beam (e.g., a 28 mW laser output beam) toward an interferometer 112 in the imaging module 110 optically coupled to the probe 120 via the sample arm 116. The interferometer 112 (e.g., a Mach-Zehnder interferometer and/or any suitable Michelson-type interferometer) is coupled to a reference 114 (e.g., a mirror) via a reference arm 115 (e.g., a cable, a conduit and/or one or more optical fibers). A detector 118 (e.g., a gain-balanced photo-detector, a spectrometer) is optically coupled to the interferometer 112 via optics 119 (e.g., one or more lens, collimators, beam splitters, diffraction gratings, transmission gratings). The detector 118 is configured to produce one or more electrical signals that generally correspond to and/or are indicative of intensities of light signals received from the interferometer 112. In some embodiments, the light signals include an interference signal resulting from a combination in the interferometer 112 of light reflected from the reference 114 and backscattered light 146 received from the region of interest via the probe 120. As described in further detail below, the processing subsystem 130 is configured to receive the electrical signals produced by the detector 118 and acquire one or more sets of image data to produce one or more medical images.

Processing Subsystem

The following discussion provides a brief, general description of a suitable environment in which the technology may be implemented. Although not required, aspects of the technology are described in the general context of computer-executable instructions, such as routines executed by a general-purpose computer. Aspects of the technology can be embodied in a special purpose computer or data processor that is specifically programmed, configured, or constructed to perform one or more of the computer-executable instructions explained in detail herein. Aspects of the technology can also be practiced in distributed computing environments where tasks or modules are performed by remote processing devices, which are linked through a communication network (e.g., a wireless communication network, a wired communication network, a cellular communication network, the Internet, a short-range radio network (e.g., via Bluetooth)). In a distributed computing environment, program modules may be located in both local and remote memory storage devices.

Computer-implemented instructions, data structures, screen displays, and other data under aspects of the technology may be stored or distributed on computer-readable storage media, including magnetically or optically readable computer disks, as microcode on semiconductor memory, nanotechnology memory, organic or optical memory, or other portable and/or non-transitory data storage media. In some embodiments, aspects of the technology may be distributed over the Internet or over other networks (e.g. a Bluetooth network) on a propagated signal on a propagation medium (e.g., an electromagnetic wave(s), a sound wave) over a period of time, or may be provided on any analog or digital network (packet switched, circuit switched, or other scheme).

The processing subsystem 130 includes several components including memory 131 (e.g., one or more computer readable storage modules, components, devices) and one or more processors 132. The memory 131 can be configured to store information (e.g., image data, subject information or profiles, environmental data, data collected from one or more sensors, media files) and/or executable instructions that can be executed by the one or more processors 132. The memory 131 can include, for example, instructions for forming, processing, or otherwise constructing medical images of a region of interest using electrical signals produced by the detector 118 that are indicative of intensities of coherent backscattered light received from the region of interest. The medical images may include, for example, one or more two-dimensional images, three-dimensional images and/or video clips comprising a graphical representation of blood perfusion and/or vascular architecture of the region of interest. As described in further detail below, the memory 131 also includes instructions for processing and analyzing medical images including instructions, for example, for generating a binarized vessel map, a skeleton vessel map, and perimeter vessel map from OCT image data. Executing instructions for evaluating the medical images may result in quantitative assessment to detect pathological abnormalities in the region of interest.

The processing subsystem 130 also includes communication components 133 (e.g., a wired communication link and/or a wireless communication link (e.g., Bluetooth, Wi-Fi, infrared and/or another wireless radio transmission network)) and a database 134 configured to store data (e.g., image data acquired from the region of interest, equations, filters) used in the generation of medical images. One or more sensors 135 can provide additional data for use in image processing and/or construction. The one or more sensors 135 may include, for example, one or more ECG sensors, blood pressure monitors, galvanometers, accelerometers, thermometers, hygrometers, blood pressure sensors, altimeters, gyroscopes, magnetometers, proximity sensors, barometers and/or hall effect sensors. One or more displays 136 can provide video output and/or graphical representations of images formed by the system 100. A power supply 137 (e.g., a power cable connected to a building power system, one or more batteries and/or capacitors) can provide electrical power to components of the processing subsystem 130 and/or the system 100. In embodiments that include one or more batteries, the power supply 137 can be configured to recharge, for example, via a power cable, inductive charging, and/or another suitable recharging method. Furthermore, in some embodiments, the processing subsystem 130 may one or more additional components 138 (e.g., one or more microphones, cameras, Global Positioning System (GPS) sensors, Near Field Communication (NFC) sensors).

In some embodiments, the processing subsystem 130 may comprise one or more components that are partially or wholly incorporated into the imaging module 110 and/or the probe 120. In other embodiments, however, the processing subsystem 130 may include components that are remote from the imaging module 110 and/or the probe 120 and connected thereto by a communication network (e.g., the Internet and/or another network). In some embodiments, for example, at least a portion of the processing subsystem 130 may reside on a mobile device (e.g., a mobile phone, a tablet, a personal digital assistant) and/or a computer (e.g., a desktop computer, a laptop) communicatively coupled to the imaging module 110 and/or the probe 120.

Suitable Methods

Figure 2:
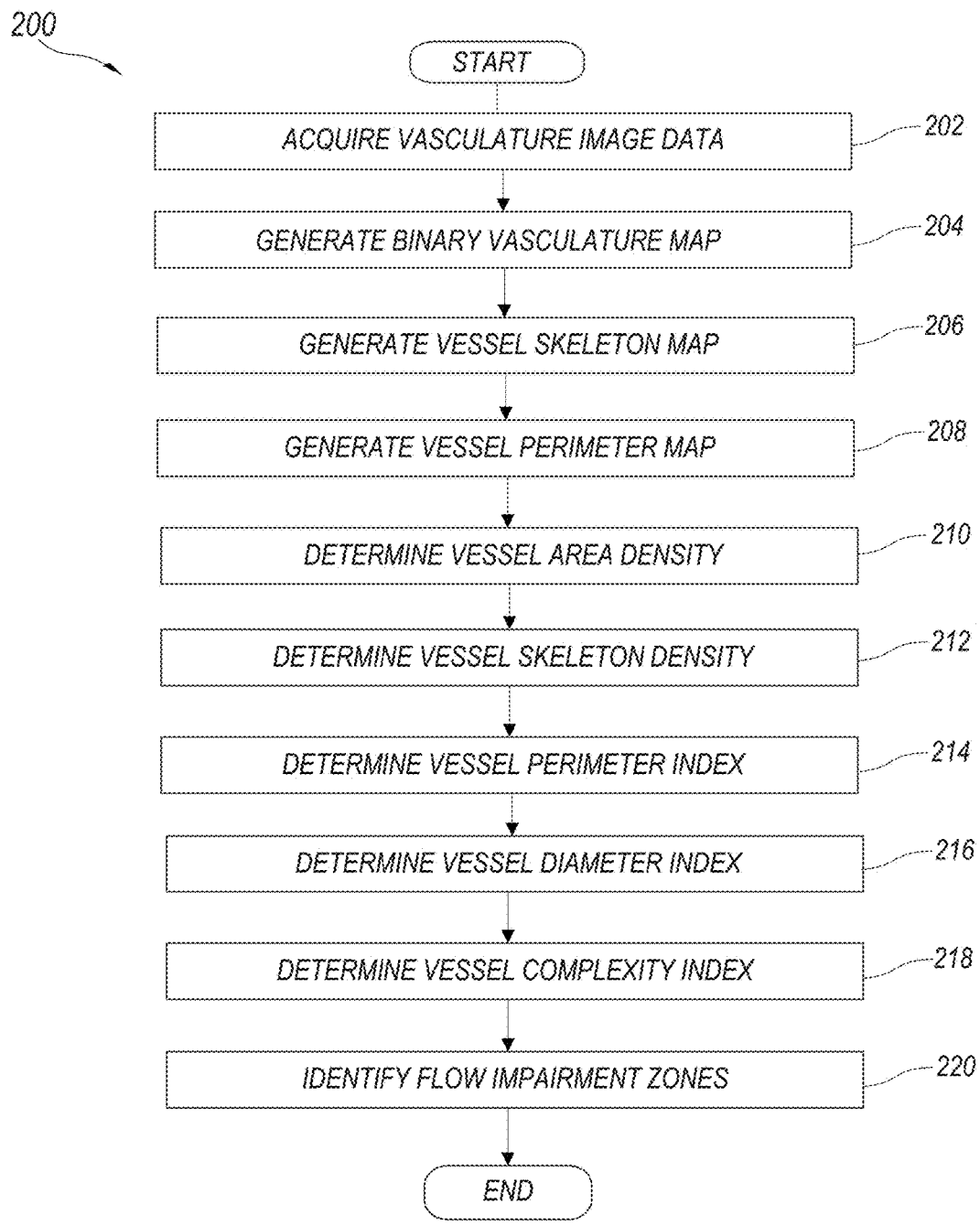
FIG. 2 is a schematic diagram of the process flow for analyzing a medical image in accordance with embodiments of the present technology.

FIG. 2 is a flow diagram of a process 200 configured in accordance with an embodiment of the present technology. The process 200 can include instructions stored, for example, on the memory 131 of the system 100 (FIG. 1) that are executable by the one or more processors 132 (FIG. 1). In some embodiments, portions of the process 200 are performed by one or more hardware components (e.g., the light source 108 and/or the imaging module 110 of FIG. 1). In certain embodiments, portions of the process 200 are performed by a device external to the system 100 of FIG. 1.

Figures 3A, 3B, 3C, 3D:
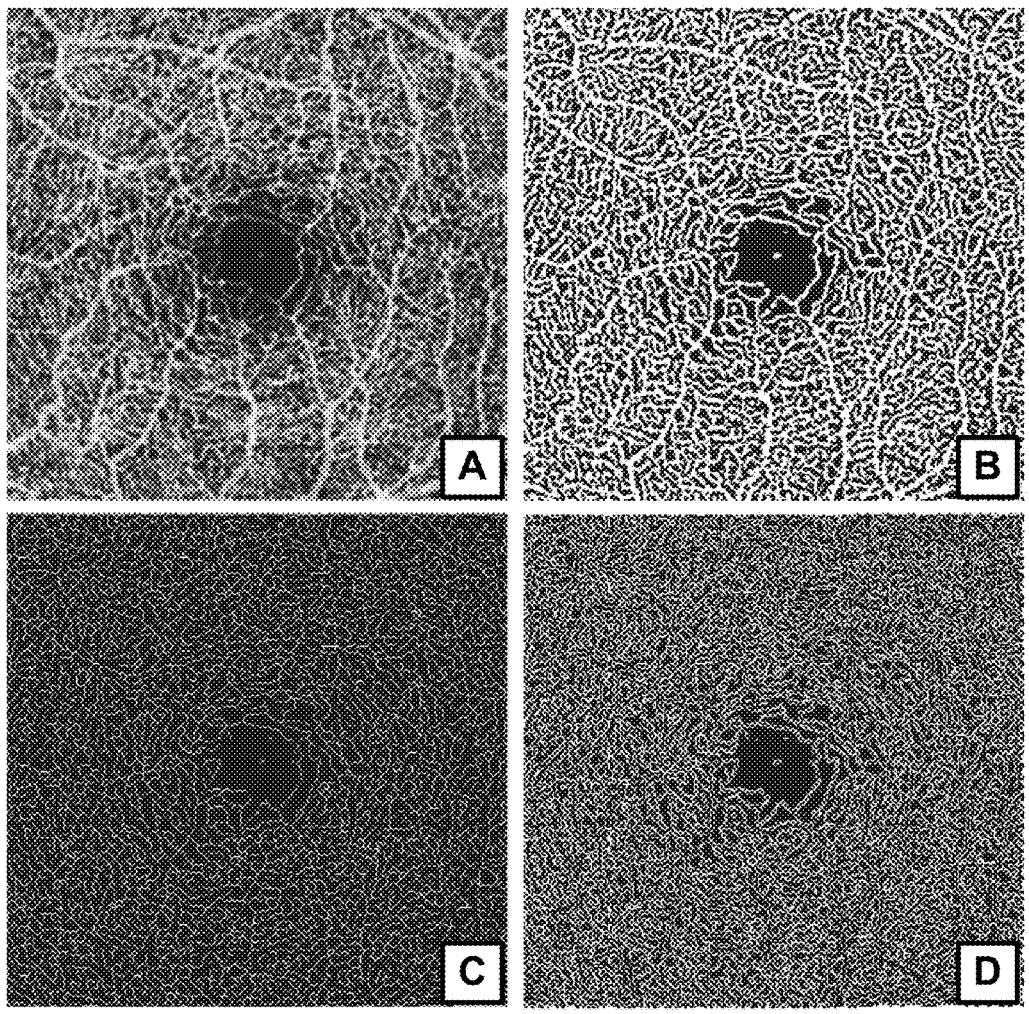
FIGS. 3A-3D are representative OMAG images including an original en face image, a binary vasculature map, a vessel skeleton map, and a vessel perimeter map, respectively.

At block 202, the process 200 acquires vasculature image data. In one embodiment, for example, the process 200 transmits laser light from a light source (e.g., the light source 108 of FIG. 1) via an imaging module (e.g., the imaging module 110 of FIG. 1A) toward a region of interest (e.g., a retina of a subject's eye). The process 200 receives backscattered light from the region of interest at a detector (e.g., the detector 118 of FIG. 1), which generates electrical signals indicative of the backscattered light received by the detector. The process 200 can use the generated signals to construct a data set. An exemplary vascular image of a subject's retina is shown in FIG. 3A.

At block 204, the process 200 continues by generating a binary vasculature map. In the binary vasculature map, the image is reduced to binary values in which one value indicates a vessel area and another value indicates a non-vessel area. For example, a value of 1 corresponds to a white pixel (i.e., existence of blood vessel) and a value of 0 corresponds to a black pixel (i.e., absence of blood vessel). In one example, the image data can be processed into a binary image in MATLAB (R2015b, MathWorks, Inc.) using a global threshold, hessian filter, and adaptive threshold. The global threshold can be determined by the noise level in the foveal avascular zone (FAZ) that is selected with a user interactive interface by asking the operator to click on the center and edge of FAZ. This global threshold is then applied to the entire image. Then, the hessian filter and adaptive threshold can be combined to generate a binary vasculature map. An exemplary binary vasculature map is shown in FIG. 3B.

At block 206, the process 200 includes generating a vessel skeleton map by skeletonizing the binary vasculature map. In the vessel skeleton map (as seen in the example in FIG. 3C), every vessel, regardless of its size or diameter, is represented by a single pixel line. The vessel skeleton map can be obtained by iteratively deleting the pixels in the outer boundary of the vessel areas in the binary vasculature map until one pixel remains along the width direction of each vessel.

At block 208, the process 200 generates a vessel perimeter map by detecting perimeters in the binary vasculature map. The vessel perimeter map (as seen in the example in FIG. 3D) includes only one pixel width along each outer edge (perimeter) of each vessel. For example, the vessel perimeter map can be obtained by detecting the edge of vessels in the binary vasculature map and deleting pixels that are not on the outermost edge of vessels. As noted below, the vessel perimeter map can be used to calculate the vessel perimeter index and the vessel complexity index.

With these three generated maps (binary vasculature map (FIG. 3B), vessel skeleton map (FIG. 3C), and vessel perimeter map (FIG. 3D)), a plurality of different indices can be determined. Five different indices described below can be calculated based on these three binary maps: the vessel area density (VAD), vessel skeleton density (VSD), vessel perimeter index (VPI), vessel diameter index (VDI), and vessel complexity index (VCI). The first three of these indices (VAD, VSD, and VPI) can together be referred to herein as the vasculature density indices, as each provides a measure of the density of a particular feature (e.g., VAD measures the vessel density, VSD measures the skeleton density, and VPI measures the perimeter density).

At block 210, the process 200 includes determining the VAD. The VAD can be calculated based on the relationship between the vessel pixels in the binary vasculature map and the total pixels in the binary vasculature map. For example, in one embodiment the VAD is calculated as a unitless ratio of the total image area occupied by vessels to the total image area in the binary vasculature map:

$$VAD = \frac{\sum_{i=1,j=1}^{n} A_{(i,j)}}{\sum_{i=1,j=1}^{n} X_{(i,j)}}$$

Where A(i,j) represents the pixels occupied by vessel area (white pixels in FIG. 3B) and X(i,j) represents all the pixels in the binary vasculature map (all pixels in FIG. 3B). (i,j) are the pixel coordinates in the OCTA image (assuming a size of n×n pixel array). VAD provides an estimate of real vessel density as it takes both vessel length and vessel diameter into consideration.

At block 212, the process 200 further includes determining the VSD. The VSD can be calculated based on the relationship between the vessel skeleton pixels in the vessel skeleton map and the total pixels in the vessel skeleton map. For example, in one embodiment the VSD is calculated as a simple ratio of the length occupied by the blood vessels to the total area in the vessel skeleton map:

$$VSD = \frac{\sum_{i=1,j=1}^{n} S_{(i,j)}}{\sum_{i=1,j=1}^{n} X_{(i,j)}}$$

Where S(i, j) represents the pixels registered as vessel length (white pixels in FIG. 3C) and X(i, j) represents all the pixels in the vessel skeleton map (all pixels in FIG. 3C). The unit for VSD in this embodiment is pixel/pixel. VSD quantifies the vessel density by only considering whether or not the vessel exists, which is simply an assessment of the vessel length density regardless of the vessel diameters. Since every vessel is presented as a single pixel line, large vessels and small capillaries contribute equally to the VSD quantification. Consequently, compared to VAD, VSD can be more sensitive to the perfusion changes at the capillary levels.

At block 214, the process 200 continues by determining the VPI. The VPI can be calculated based on the relationship between the vessel perimeter pixels in the vessel perimeter map and the total pixels in the vessel perimeter map. For example, in one embodiment the VPI is calculated using the vessel perimeter map as a simple ratio of the vessel perimeter to the total area of the OCTA image:

$$VPI = \frac{\sum_{i=1,j=1}^{n} P_{(i,j)}}{\sum_{i=1,j=1}^{n} X_{(i,j)}}$$

Where P(i, j) represents all the pixels within vessel perimeters (white pixels in FIG. 3D) and X(i, j) represents all the pixels in the vessel perimeter map (all pixels in FIG. 3D). The unit for VPI in this embodiment is pixel/pixel. Contrary to the vessel skeleton density, the vessel perimeter index uses the perimeter to present every vessel, which includes an indication of both the length and the diameter, similar to vessel area density.

At block 216, the process 200 includes determining the VDI. The VDI can be calculated based on the relationship between the vessel area in the binary vasculature map and the skeleton area in the vessel skeleton map. In one embodiment, the VDI is calculated using a ratio between the binary vasculature map and the skeletonized vessel map to yield the averaged vessel caliber as follows:

$$VDI = \frac{\sum_{i=1,j=1}^{n} A_{(i,j)}}{\sum_{i=1,j=1}^{n} S_{(i,j)}}$$

Where A(i, j) represents all the pixels registered as vessel area in the binary vasculature map (white pixels in FIG. 3B) and S(i, j) represents the pixels registered as vessel length in the vessel skeleton map (white pixels in FIG. 3C). The unit of VDI in this embodiment is pixel and can be converted into micron by multiplying VDI by pixel size. All VDI data in the examples below have been converted into microns. VDI provides a measure of the averaged vessel caliber within the image. VDI presents the vessel size information regardless of the vessel length, therefore it is sensitive to vascular dilation in the OCTA images. With a VDI map (i.e., a visualization in which VDI values are plotted over the OCTA image using a heat map or other technique), localized vascular dilation would be easily identified and serve as a marker of vascular abnormalities.

At block 218, the process 200 further continues by determining the VCI. The VCI can be calculated based on the relationship between the perimeter pixels in the vessel perimeter map and the total vessel pixels in the binary vasculature map. For example, in one embodiment the VCI is calculated using the vessel perimeter map and the binary vasculature map as follows:

$$VCI = \frac{\left(\sum_{i=1,j=1}^{n} P_{(i,j)}\right)^2}{4\pi \sum_{i=1,j=1}^{n} A_{(i,j)}}$$

Where P(i, j) represents all the pixels included in the perimeters in the vessel perimeter map (white pixels in FIG. 3D) and A(i, j) represents all the pixels of the vessel area in the binary vasculature map (white pixels in FIG. 3B). The VCI is also a unitless parameter and derived from the digital image processing discipline. With the vessel complexity map, specific locations where the vascular morphology is less complicated could be identified. In most cases, decreased perfusion would result in less complex vasculature. This vessel complexity index serves to quantify morphological characteristics of the retinal vasculature. In some embodiments, the process 200 can generate a VCI map (i.e., a visualization in which vessel complexity values are plotted over the OCTA image using a heat map or other technique.

Figures 4A, 4B, 4C, 4D, 4E, 4F, 4G, 4H, 4I, 4J, 4K:
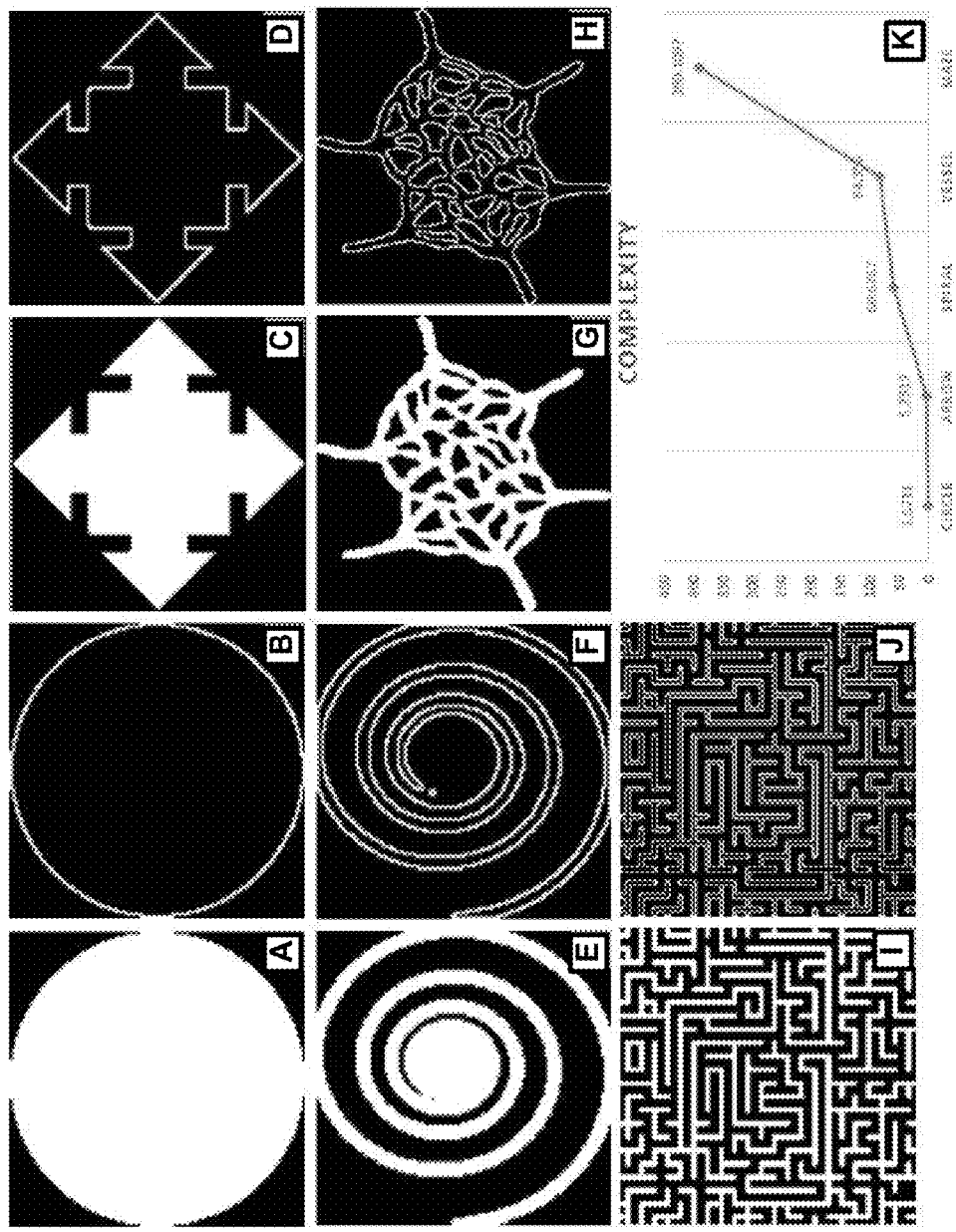

To better illustrate the concept of VCI, an example illustrates the robustness of this quantitative parameter. As shown in FIG. 4, five images were selected as examples for the calculation of VCI. Binary area images are shown for a circle, arrow, spiral, vessel, and maze in FIGS. 4A, 4C, 4E, 4G, and 4I, respectively, and corresponding perimeter images are shown in FIGS. 4B, 4D, 4F, 4H, and 4J, respectively. The VCI results for each object are plotted in FIG. 4K, with the exact values denoted above each data point. As seen in FIG. 4K, there is a positive relationship between VCI and visual complexity—as VCI increases, the visual complexity of the image also increases.

Returning to FIG. 2, at block 220, the process 200 identifies any flow impairment zones. The areas of flow impairment can be automatically detected based on the vessel skeleton map. In one example, the negation of the vessel skeleton map can be first obtained, followed by morphological operations to remove smaller unconnected regions (e.g., smaller than 600 pixels) that arise naturally between normal vessels. In other words, the binary values in the vessel skeleton map can be inverted, such that the non-skeleton portions are rendered white and the skeleton portions are rendered black. Then, the smaller white regions (e.g., less than 600 pixels) can be converted to black, leaving only white regions that are greater than the predetermined threshold (e.g., greater than 600 pixels). The threshold size can be determined experimentally, and may differ among different patients and different OCT systems. Finally, a Gaussian filter (e.g., with a kernel size of 3 pixels by 3 pixels) can be used to smooth the edges of the detected regions of flow impairment. The remaining white areas in the flow impairment image indicate relatively large areas in which perfusion may be expected in normal vasculature but is absent in the analyzed image data, thereby indicating a flow impairment region and potential pathology.

The five indices described above (VAD, VSD, VDI, VPI, and VCI) and the flow impairment determination can be used to detect pathological or non-pathological abnormalities in the region of interest, for example a subject's retina. In some embodiments, only a subset of the indices outlined above are used to detect abnormalities. In still other embodiments, a single one of the indices can be utilized to detect pathological abnormality in the vascular image data. These metrics are expected to be highly repeatable and useful to provide clinicians and physicians with a rapid and comprehensive strategy for interpreting OCT angiograms. In particular, a vessel density map, vessel diameter map, and vessel complexity map may be useful for detecting regions with vascular abnormalities that could also leak fluorescein on FA images, which has traditionally been difficult for OCTA techniques to accomplish. As a result, quantitative OCTA using these indices has demonstrable utility for research and clinical management of ocular diseases.

In some embodiments, the values of each of these indices can be compared with a predetermined normal value (for example, as determined experimentally). If any one of these indices is found to deviate from the normal by more than a predetermined threshold amount (e.g., more than one standard deviation away from the normal, more than two standard deviations away from the normal, etc.), then the index can be flagged and an indication of potential abnormality can be provided (e.g., via the display 136 (FIG. 1)). In other embodiments, a weighted sum of some or all of the indices can be calculated to provide an overall score which can, in turn, be compared against a predetermined normal range to determine whether a potential abnormality has been found. In some embodiments, the index values (along with a corresponding normal range for each index) can be displayed to a user (e.g., a physician) along with one or more of the qualitative OCTA images for evaluation. By providing this quantitative data, physicians and other users can be better equipped to evaluate OCT image data from the region of interest, whether to monitor ongoing treatment, or to detect physiological abnormalities.

EXAMPLES

Several illustrative cases are provided below to demonstrate the usefulness of the quantitative metrics enabled by the present technology.

1. Normal Subjects

The three dimensional (3D) nature of OCT allows for segmentation of vascular plexi located at different physiological depths within the retina. Using a validated semi-automatic segmentation software, the retinal microvasculature can be segmented into three distinct physiological layers: the superficial vascular network encompassing from ganglion cell layer to inner plexiform layer, the deep vascular network including the outer plexiform layer, and the avascular outer retinal layer extending from outer nuclear layer to retinal pigment epithelium. The retinal nerve fiber layer is excluded in the following examples since the vasculature in this layer is morphologically different from the vasculature in the deeper retinal layers, especially for large FOV OCTA scans. However, this layer can be included in the analysis if needed. The vessel density map, vessel diameter map, and vessel complexity map can be calculated and overlaid with the binary vasculature map (FIG. 3B), which would make it easier to localize the particular vessels of interests. Good correlations were observed in these three maps with the anatomic features of the retinal vasculature. For both vessel density map and vessel diameter map, large vessels in the superficial layer indicate higher density/diameter. In the vessel complexity map, large vessels indicate less complex in morphology compared to capillaries, In the vessel complexity map, areas of higher vessel complexity index correspond to the radial fan-like capillaries that originate from vertical anastomosis connecting superficial and deep network.

With the techniques disclosed herein, VAD, VSD, VPI, VDI and VCI can all be quantified from the OMAG images. For illustrative purposes, an example of five quantitative indices has been given in Table 1 based on the entire retinal image. To aid quantitative analysis, normal subjects can be evaluated to determine typical ranges for each of the various indices. Descriptive statistics of normal subjects are shown in Table 1. This data was obtained from normal subjects, each subjected to 6.72 mm×6.72 mm montage OCTA scans. Additional normal subjects can be evaluated to further refine the predetermined "normal" values for the indices. With the establishment of a normal database, diseased cases can be compared with normal cases, and disease progression or classification may also be feasible as a result.

TABLE 1

Statistics of quantitative indices for normal subjects

| | Mean | Stardard Deviation | Lower 95% | Upper 95% |
|---|---|---|---|---|
| Vessel Diameter Index | 20.363 | 0.409 | 20.216 | 20.511 |
| Vessel Area Density | 0.470 | 0.019 | 0.463 | 0.477 |
| Vessel Skeleton Density | 0.135 | 0.005 | 0.134 | 0.137 |
| Vessel Permeter Index | 0.323 | 0.009 | 0.320 | 0.326 |
| Vessel Complexity Index | $1.216 \times 10^9$ | $2.725 \times 10^7$ | $1.206 \times 10^9$ | $1.226 \times 10^9$ |

2. Diabetic Retinopathy

Quantitative OMAG analysis was also applied to an eye with non-proliferative diabetic retinopathy (NPDR). The areas of flow impairment were automatically detected according to the vessel skeleton map as described above. Vessel density, diameter, and complexity maps were also quantified. Overlying the quantitative maps onto a binary vessel area map indicated that the regions of capillary flow impairment are often associated with an increase of vessel diameter and a decrease in vessel area density and vessel complexity, which agrees well with clinical features observed from DR patients. Specific quantitative results are shown in Table 2.

TABLE 2

Quantitative analysis of a normal case and a NPDR case.

| Indices | Vessel Diameter Index | Vessel Area Density | Vessel Skeleton Density | Vessel Perimeter Index | Vessel Complexity Index | Flow Impairment Zone (mm$^2$) |
|---|---|---|---|---|---|---|
| Normal | 24.421 | 0.518 | 0.146 | 0.349 | 17838.540 | 0.264 |
| DR | 24.665 | 0.370 | 0.101 | 0.245 | 12954.770 | 3.450 |

3. Repeatability in Branch Retinal Vein Occlusion (BRVO) and Normal Cases

In another example, the same subject diagnosed with BRVO was scanned twice at different time points one month apart. This case was clinically diagnosed as stable over the time period as judged by fundus examination, FA, and visual acuity. OMAG results demonstrated that the detailed characteristics of BRVO such as vascular dilation and capillary non-perfusion are repeatable between these two scans. Quantitative maps also showed great repeatability, where the increase in vessel diameter and decrease in vessel density and vessel complexity were present in regions of the vein occlusion in both scans. VAD, VSD, VDI, VPI and VCI were also quantified on two scans. Results showed high repeatability as the coefficients of variance were all smaller than 0.031 (Table 3). In doing so, each map was resized to 100 superpixels and repeatability between different scans was quantified based on these 100 samples.

TABLE 3

Quantitative analysis and repeatability test of a BRVO case for two repeated scans

| | Vessel Diameter Index | Vessel Area Density | Vessel Skeleton Density | Vessel Perimeter Index | Vessel Complexity Index |
|---|---|---|---|---|---|
| Scan 1 | 35.300 | 0.449 | 0.175 | 0.395 | 2862.719 |
| Scan 2 | 34.196 | 0.451 | 0.182 | 0.393 | 2827.102 |
| Coefficient of Variance | 0.017 | 0.014 | 0.013 | 0.031 | 0.014 |

Similarly, two repeated scans of a normal subject showed great repeatability of not only the OMAG en face images, but also three quantitative maps. Coefficients of variance were also quantified for five quantitative indices and all were no greater than 0.021 (Table 3). Therefore, the OCTA quantification algorithm can be useful for monitoring disease progression and treatment response.

TABLE 4

Repeatability test of a normal case.

| | Vessel Diameter Index | Vessel Area Density | Vessel Skeleton Density | Vessel Perimeter Index | Vessel Complexity Index |
|---|---|---|---|---|---|
| Scan 1 | 23.206 | 0.511 | 0.151 | 0.353 | 19282.771 |
| Scan 2 | 23.619 | 0.512 | 0.149 | 0.351 | 18979.230 |

TABLE 4-continued

Repeatability test of a normal case.

| | Vessel Diameter Index | Vessel Area Density | Vessel Skeleton Density | Vessel Perimeter Index | Vessel Complexity Index |
|---|---|---|---|---|---|
| Coefficient of Variance | 0.018 | 0.009 | 0.021 | 0.011 | 0.017 |

Figures 5A, 5B, 5C, 5D, 5E, 5F:
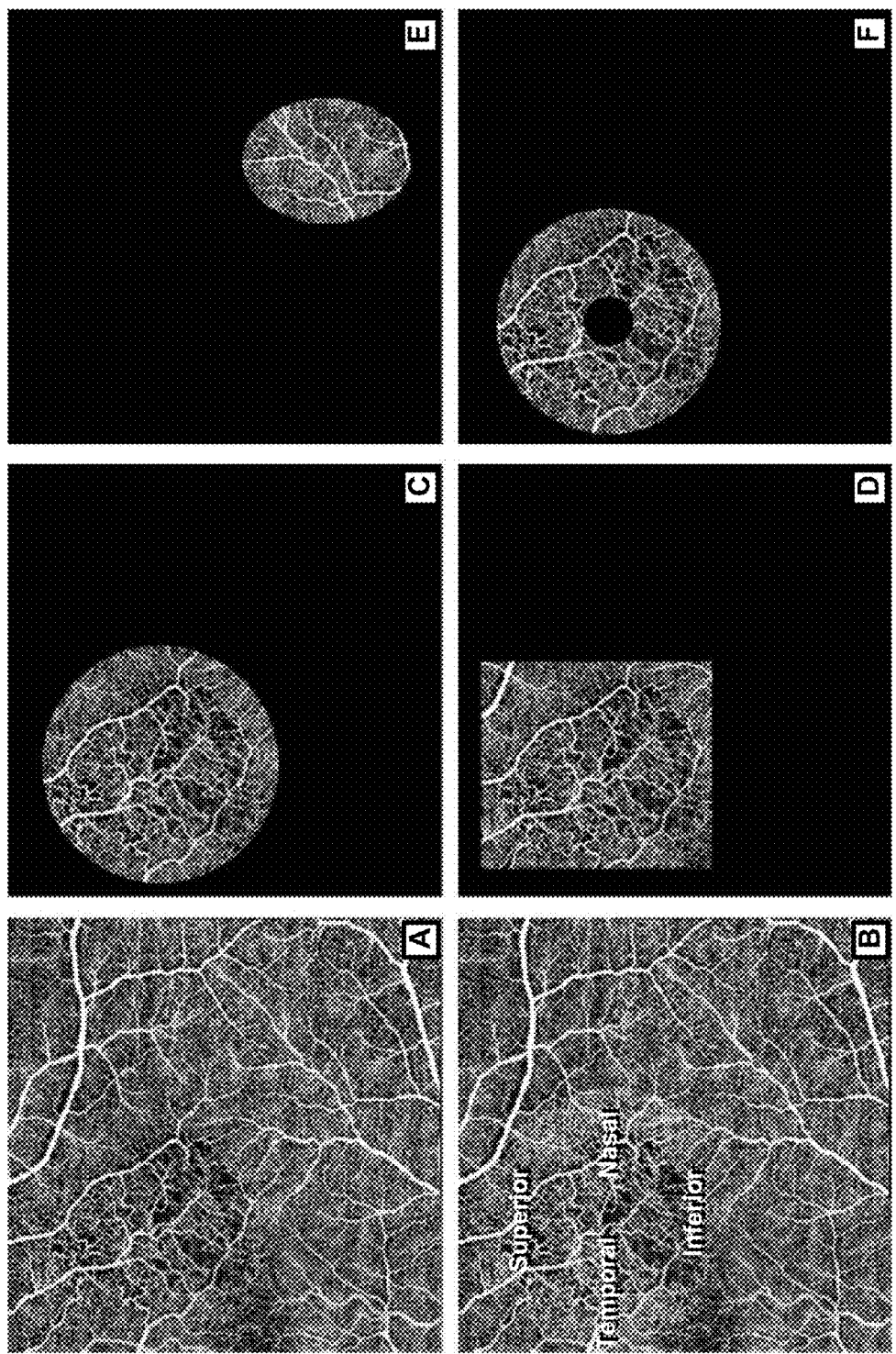
FIGS. 5A-5F illustrate various OMAG images with different regions of interest selected.

In some embodiments the operator can flexibly select a region of interest on the en face image with the following options of e.g., a rectangle, circle, ring, or ellipse. FIGS. 5A-5F show examples of the ROI selection. In particular, FIG. 5A is the original OMAG en face image, FIG. 5B shows the quadratic analysis with a ring ROI, and FIG. 5C-F show the circle, rectangle, ellipse and circle ROI selections, respectively. Table 5 lists the specific quantitative values when different ROIs are selected. If the selection is a ring, it can divided into four quadrants to enable quadrant specific quantification. Table 6 lists results of quadratic analysis of this BRVO case. Noted that in the scans centered at fovea, the operator can choose to center their ring ROI at the fovea centralis.

TABLE 5

Quantitative analysis of a BRVO case with different choice of region of interest

| | Vessel Area Density | Vessel Skeleton Density | Vessel Perimeter Index | Vessel Diameter Index | Vessel Complexity Index | ROI Size (mm*mm) |
|---|---|---|---|---|---|---|
| Whole Image | 0.493 | 0.200 | 0.419 | 32.554 | 7234.772 | 44.890 |
| Circle | 0.491 | 0.195 | 0.418 | 33.272 | 396.946 | 10.521 |
| Rectangle | 0.491 | 0.193 | 0.415 | 33.633 | 457.660 | 11.389 |
| Ellipse | 0.519 | 0.220 | 0.454 | 31.28575 | 62.690 | 3.964 |
| Ring | 0.494 | 0.193 | 0.416 | 33.812 | 285.845 | 8.987 |

TABLE 6

Quadratic quantitative analysis of a BRVO case.

| | Vessel Area Density | Vessel Skeleton Density | Vessel Perimeter Index | Vessel Diameter Index | Vessel Complexity Index | ROI Size (mm*mm) |
|---|---|---|---|---|---|---|
| Superior | 0.493 | 0.197 | 0.411 | 33.942 | 239.2756 | 6.0934 |
| Inferior | 0.473 | 0.202 | 0.424 | 32.034 | 257.6289 | 6.0934 |
| Nasal | 0.478 | 0.200 | 0.424 | 32.838 | 251.9077 | 6.0934 |
| Temporal | 0.489 | 0.194 | 0.413 | 34.292 | 237.8684 | 6.0934 |
| Whole Image | 0.493 | 0.200 | 0.419 | 32.554 | 7234.772 | 44.890 |

4. Macular Telangiectasia Type 2

OMAG image and quantitative maps were generated for an early stage MacTel2 case. As is typical in MacTel2 cases, the juxtafoveal leakage is more prominent temporally than nasally. The vessel diameter map and vessel complexity map demonstrated good accordance with the dye leakage on FA, and all demonstrated the telangiectatic changes in the microvasculature. With the dilation of the juxtafoveal microvasculature, local vessel diameter increased and the local vessel complexity decreased significantly, when compared to the relatively normal regions. The comparison between the entire retinal vasculature and deep capillary plexus also validates that the early telangiectatic changes mainly occur in deep capillary plexus as the quantitative maps manifest more obvious changes. With the segmentation strategy and high resolution OMAG images, a detailed depiction of the deep retinal microvasculature can be produced, which cannot be achieved using traditional FA. Good correlations were observed between the leaking regions on FA and the abnormal regions on the vessel diameter map and the vessel complexity map on the OMAG images. This observation indicates that quantitative OMAG has the ability not only to detect the same vascular abnormalities as FA, but also to provide information about the areas of potential leakage without the need for FA.

As compared to a normal subject, the MacTel2 case had a lower global vessel area density. Distinct differences were found on both vessel diameter maps and vessel complexity maps. The MacTel2 case also shows a significantly increased value in the juxtafoveal temporal and nasal regions on the vessel diameter map when compared with the normal case and an extensively decreased vessel complexity value when compared with the normal eye in the same regions of interest.

Moreover, the five-index quantitative analysis described herein may be useful in treatment monitoring. Quantitative analysis was performed on a patient who received monthly injections of a vascular endothelial growth factor (VEGF) inhibitor from over a period of three months. OCTA scans were performed at each visit with the first scan before treatment and the subsequent two scans performed one month after each treatment. OCTA volume data were segmented into superficial retinal layer, deep retinal layer, and outer retinal layer. En face images were generated for each layer using maximum projection for all three scans, which were repeated for each visit. For each visit, the deep retinal layer angiograms were chosen for the quantification of vessel density maps, vessel diameter maps, and vessel complexity maps. By observing these quantitative maps after the first injection, the VDI decreased between the first and second visits, and the VCI increased. In order to test whether quantitative analysis is able to monitor the changes in vascular abnormalities after treatment, quadrant-specific statistical analysis was performed on this case for all three visits. A 2-mm circle was selected for statistical analysis, and superior, inferior, temporal and nasal quadrants were evaluated separately. In each quadrant, all data points were equally divided into ten subsets and the averaged values were used to represent each subsets. Therefore, there were ten samples of each quantitative index for each quadrants. The averaged value of each quadrant for each index are shown in Table 6. ANOVA was performed and the VDI showed significant decrease in superior, temporal and inferior quadrants after treatment while VCI were found to have significantly increased in temporal and inferior quadrants after treatment. No significant differences were found in any quadrants for VAD, VSD or VPI.

TABLE 7

Quantitative analysis of a MacTel2 case receiving anti-VEGF treatment

| Indices | Quadrant | Jan. 9, 2015 | Feb. 5, 2015 | Mar. 31, 2015 |
|---|---|---|---|---|
| Vessel Diameter Index | Superior* | 21.397 | 19.704 | 18.995 |
| | Temporal* | 20.228 | 18.857 | 18.063 |
| | Inferior* | 19.901 | 19.082 | 18.268 |
| | Nasal | 19.441 | 18.916 | 19.228 |
| Vessel Area | Superior | 0.391 | 0.368 | 0.341 |
| | Temporal | 0.364 | 0.322 | 0.340 |

TABLE 7-continued

Quantitative analysis of a MacTel2 case receiving anti-VEGF treatment

| Indices | Quadrant | Jan. 9, 2015 | Feb. 5, 2015 | Mar. 31, 2015 |
|---|---|---|---|---|
| Density | Inferior | 0.401 | 0.378 | 0.395 |
| | Nasal | 0.388 | 0.374 | 0.361 |
| Vessel Complexity Index | Superior | 4.615 | 4.952 | 4.852 |
| | Temporal* | 4.840 | 4.726 | 5.307 |
| | Inferior* | 5.313 | 5.378 | 5.830 |
| | Nasal | 5.112 | 5.371 | 5.329 |
| Vessel Skeleton Index | Superior | 0.097 | 0.095 | 0.092 |
| | Temporal | 0.092 | 0.086 | 0.096 |
| | Inferior | 0.105 | 0.103 | 0.107 |
| | Nasal | 0.097 | 0.098 | 0.094 |
| Vessel Perimeter Index | Superior | 0.225 | 0.221 | 0.213 |
| | Temporal | 0.236 | 0.221 | 0.241 |
| | Inferior | 0.264 | 0.257 | 0.271 |
| | Nasal | 0.250 | 0.254 | 0.248 |

*indicates $p < 0.05$ in ANOVA test

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. Moreover, in some embodiments, the technology can be used, for example, to form images of tissue in a subject's eye and/or brain. In other embodiments, however, the technology may be used to form images of tissue from any portion of a subject's anatomy. The various embodiments described herein may also be combined to provide further embodiments.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method of analyzing an anatomical region of interest of a subject, the method comprising:
    acquiring vascular image data from the region of interest of the subject;
    generating a binary vasculature map from the vascular image data;
    generating a vessel skeleton map from the binary vasculature map;

identifying a flow impairment zone in the region of interest based on the vessel skeleton map;
generating a vessel perimeter map from the binary vasculature map; and
based on the binarized vasculature map, the vessel skeleton map, and the vessel perimeter map, determining each of—
a vasculature density index;
a vessel diameter index; and
a vessel complexity index.

2. The method of claim 1 wherein determining a vasculature density index comprises determining each of a vessel area density, a vessel skeleton density, and a vessel perimeter index, and wherein:
the vessel area density is determined based on the binary vasculature map;
the vessel skeleton density is determined based on the vessel skeleton map;
the vessel perimeter index is determined based on the vessel perimeter map;
the vessel diameter index is determined based on both the binary vasculature map and the vessel skeleton map; and
the vessel complexity index is determined based on both the binary vasculature map and the vessel perimeter map.

3. The method of claim 1, further comprising, based on at least one of the determined vasculature density index, vessel diameter index, vessel complexity index, or flow impairment zone, evaluating treatment efficacy monitoring treatment of at least one of a branch retinal vein occlusion, central retinal vein occlusion, glaucoma, age-related macular degeneration, diabetic retinopathy, or macular telangiectasia type 2.

4. The method of claim 1, further comprising, based on at least one of the determined vasculature density index, vessel diameter index, vessel complexity index, or flow impairment zone, detecting the presence of a vascular abnormality.

5. The method of claim 1 wherein the vasculature density index comprises a vessel area density, and wherein the vessel area density is determined based, at least in part, on the relationship of vessel pixels in the binary vasculature map and total pixels in the binary vasculature map.

6. The method of claim 1 wherein the vasculature density index comprises a vessel skeleton density, and wherein the vessel skeleton density is determined based, at least in part, on a relationship between vessel skeleton pixels in the vessel skeleton map and total pixels in the vessel skeleton map.

7. The method of claim 1 wherein the vasculature density index comprises a vessel perimeter index, and wherein the vessel perimeter index is determined based, at least in part, on a relationship between vessel perimeter pixels in the vessel perimeter map and total pixels in the vessel perimeter map.

8. The method of claim 1 wherein the vessel diameter index is determined based, at least in part, on a relationship between vessel perimeter pixels in the vessel perimeter map and vessel skeleton pixels in the vessel skeleton map.

9. The method of claim 1 wherein the vessel complexity index is determined based, at least in part, on a relationship between vessel perimeter pixels in the vessel perimeter map and vessel pixels in the binary vasculature map.

10. A method of operating a medical imaging system to evaluate a region of interest of a subject, the method comprising:
transmitting a plurality of light pulses from a laser light source toward the region of interest of the subject;
receiving backscattered light from the region of interest at a detector optically coupled to the laser light source;
acquiring data from the region of interest using signals generated by the detector that are indicative of backscattered light received at the detector;
based on the acquired data, generating a binary vessel map;
based on the binarized vessel map, generating a vessel skeleton map and a vessel perimeter map;
based on the binary vessel map, the vessel skeleton map, and the vessel perimeter map, determining each of—
a vasculature density index;
a vessel diameter index; and
a vessel complexity index.

11. The method of claim 10, wherein determining a vasculature density index comprises determining each of: a vessel area density, a vessel skeleton density, and a vessel perimeter density, and wherein:
the vessel area density is determined based on the binary vasculature map;
the vessel skeleton density is determined based on the vessel skeleton map;
the perimeter vessel density is determined based on the vessel perimeter map;
the vessel diameter index is determined based on both the binary vasculature map and the vessel skeleton map; and
the vessel complexity index is determined based on both the binary vasculature map and the vessel perimeter map.

12. The method of claim 10, further comprising identifying a flow impairment zone in the region of interest based on the vessel skeleton map.

13. The method of claim 10 wherein the vasculature density index comprises a vessel perimeter index, and wherein the vessel perimeter index is determined based on a relationship between vessel perimeter pixels in the vessel perimeter map and total pixels in the vessel perimeter map.

14. The method of claim 10 wherein the vessel diameter index is determined based on a relationship between vessel perimeter pixels in the vessel perimeter map and vessel skeleton pixels in the vessel skeleton map.

15. The method of claim 1, wherein the vessel complexity index is determined based on a relationship between vessel perimeter pixels in the vessel perimeter map and vessel pixels in the binary vasculature map.

16. A medical imaging system configured to produce and analyze images of a subject, the system comprising:
a light source configured to produce laser light;
an imaging module optically coupled to the light source, wherein the imaging module is configured to (a) direct the laser light toward a region of interest in the subject and (b) receive backscattered light from the subject;
a detector optically coupled to the imaging module, wherein the detector is configured to produce electrical signals that correspond to light received from the imaging module; and
a processor and memory operatively coupled to the detector, wherein the memory includes instructions that, when executed by the processor, are configured to perform the operations including—
acquiring image data from the region of interest in the subject using the signals produced by the detector;
constructing a binary vasculature map based on the acquired image data;
constructing a vessel skeleton map and a vessel perimeter map based on the binary vasculature map;

based on the binary vessel map, the vessel skeleton map, and the vessel perimeter map, determining each of—
  a vasculature density index;
  a vessel diameter index; and
  a vessel complexity index.

17. The system of claim 16 wherein the memory further includes instructions that, when executed by the processor, are configured to perform the operations such that determining a vasculature density index comprises determining each of: a vessel area density, a vessel skeleton density, and a vessel perimeter density, and wherein:
  the vessel area density is determined based on the binary vasculature map;
  the vessel skeleton density is determined based on the vessel skeleton map;
  the perimeter vessel density is determined based on the vessel perimeter map;
  the vessel diameter index is determined based on both the binary vasculature map and the vessel skeleton map; and
  the vessel complexity index is determined based on both the binary vasculature map and the vessel perimeter map.

18. The system of claim 16 wherein the memory further includes instructions that, when executed by the processor, are configured to perform the operation of identifying a flow impairment zone in the region of interest based on the vessel skeleton map.

19. The system of claim 16 wherein the memory further includes instructions that, when executed by the processor, are configured to perform the operation of indicating detection of a physiological abnormality based on one or more of the determined vasculature density index, vessel diameter index, the vessel complexity index, or flow impairment zone.

* * * * *